Patented Feb. 11, 1936

2,030,659

UNITED STATES PATENT OFFICE 2,030,659

PROCESS OF MANUFACTURING SOLUBLE SALTS OF BARIUM AND STRONTIUM

Randolph Norris Shreve and William N. Pritchard, Jr., West Lafayette, Ind., and Henry V. Farr, Ferguson, and Arthur John Still, St. Louis, Mo., and John D. Crosby, Arlington, N. J., assignors to Mallinckrodt Chemical Works, St. Louis, Mo., a corporation of Missouri No Drawing. Application December 10, 1934, Serial No. 756,828

13 Claims. (Cl. 23—90)

This invention relates to processes for manufacturing soluble salts of barium and strontium from insoluble salts thereof.

Among the several objects of the invention may be noted the provision of processes of the class described which produce the desired soluble salts of barium and strontium in optimum conditions of purity with a minimum of complicated procedural steps; the provision of processes of the class described which are highly economical to carry through and which provide product yields of a high percentage of the theoretical yields; and the provision of processes of the class described which may be carried through in a routine manner, without excessive care to control conditions. Other objects will be in part obvious and in part pointed out hereinafter.

The invention accordingly comprises the steps and sequence of steps, and features of synthesis, which will be exemplified in the processes hereinafter described, and the scope of the application of which will be indicated in the following claims.

In United States Patent No. 1,752,244, granted on March 25, 1930, to Henry V. Farr (one of the present applicants), there is disclosed a process of refining crude barium sulphate which proceeds by treating the crude barium sulphate with a salt such as calcium chloride, therein stated to be capable of forming with the barium sulphate a complex or addition salt, and thereafter hydrolizing the resultant "complex" salt with water to reprecipitate the barium sulphate in a state of fine subdivision and a high degree of purity. Such process has proved to be highly satisfactory from a commercial standpoint, but further research has cast a doubt upon the mechanism of the reaction, specifically, whether the barium sulphate and calcium chloride form the recited complex salt.

The present invention is predicated upon a different explanation of the underlying mechanism of the reaction above described. For example, let the following reaction be considered:

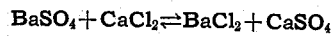

$$BaSO_4 + CaCl_2 \rightleftharpoons BaCl_2 + CaSO_4$$

It has been determined definitely that this is a true reversible reaction. In dilute aqueous solutions, and even in solutions of a moderate degree of concentration, this reaction proceeds to the left, precipitating barium sulphate. However, if the solutions be highly concentrated, or if there be a total absence of water (as, for example, in a fused mixture of salts, or by heating, until all water has evaporated), the reaction proceeds practically completely to the right.

The reasons for these phenomena have not been positively established. However, as a theory accounting for the actions involved, it may be postulated that the direction of the reaction depends upon the concentration of the calcium chloride. When this concentration is sufficiently high, the reaction proceeds towards the right. This is presumably due to the depressant action exerted by the high concentration of calcium ions which has the effect of lowering the ionization of calcium sulphate below that of barium sulphate, thus forming insoluble calcium sulphate. Simultaneously, the high concentration of the chloride ion has a powerful depressant action upon the ionization of barium chloride to the extent that the latter is almost completely precipitated in the form of barium chloride. By diluting this mixture with water the concentration of the calcium chloride decreases and the reaction conversely proceeds to the left.

Regardless of the theoretical aspects of the above phenomena, the present invention is founded upon the ascertained facts. Briefly, the present invention comprises effecting a reaction such as the above in which the stable condition is on the right-hand side, and then extracting the resultant reaction mixture with a solvent that dissolves the soluble barium salt (barium chloride in the above reaction) but leaves the calcium salt (calcium sulphate above) substantially undissolved. The selection of the solvent is important, for it will be apparent from the above that if water alone, for example, is used, the reaction will immediately reverse with re-precipitation of barium sulphate (this is apparently a more valid explanation of the mechanism of the reaction of the said Farr Patent 1,752,244, which is concerned with the production of pure barium sulphate, than is the complex salt formation theory therein advanced.)

The following specific examples will serve to point out the present invention more clearly:

*Example 1*

One part by weight of barium sulphate, or ground barite ("barytes"), is mixed with two parts by weight of calcium chloride dissolved in one and one-half parts of water. The mixture is then heated at a temperature between 100° and 200° C. for 3 to 12 hours. At the conclusion of this heating, the reaction mass is allowed to cool and then extracted with a mixture of three parts of methanol and one part of ethylene glycol.

Barium chloride is dissolved from the mass, together with the remaining calcium chloride, but substantially no calcium sulphate or un-reacted upon barium sulphate is dissolved. By evaporating off the methanol-ethylene glycol solvent and then crystallizing from water, the barium chloride is separated from the calcium chloride. Yields up to 80% or more of the theoretical are obtainable, depending at least in part upon the fineness to which the barium sulphate has been ground, and the technique employed.

Example 2

Equal molecular proportions of barium sulphate and calcium chloride (about 5 parts to 3 parts by weight) are fused together at a red heat for a short time. A clear fusion is obtained. The fusion product is allowed to cool, comminuted, and extracted with the methanol-ethylene glycol mixture described above. Barium chloride is finally obtained in a high degree of purity in yields up to 95% or more of the theoretical.

Example 3

Equal parts by weight of barium sulphate and calcium chloride are boiled together in aqueous solution (two parts or more of water), until all of the water is driven off. By following the extraction procedure above given upon the resulting mass, barium chloride is obtained in yields up to 88% or more of the theoretical.

Among the solvents found to be suitable for the extraction procedure, and possessing the selective property described, in addition to the methanol-ethylene glycol mixture above described, may be mentioned the following: pure methanol, methanol which has been diluted to a limited extent with water, ethanol, propanol, ethylene glycol, propylene glycol, a partially saturated solution of calcium chloride in methanol, or mixtures of these.

The description has so far been limited to the preparation of barium chloride by the use of calcium chloride. Other soluble salts of barium may be made by the same process, and under the same conditions, using the corresponding salt of calcium. For example, barium nitrate may be made with barium sulphate and calcium nitrate. Nor is it necessary that the treating salt be one of calcium. Magnesium chloride, aluminum chloride, and other chlorides have been found to be suitable substitutes for the calcium chloride in the process of producing barium chloride, and the corresponding nitrates suitable for the production of barium nitrate.

By similar procedures upon strontium sulphate, the corresponding soluble salts of strontium may be prepared.

To generalize, it may be said that the present invention comprehends the treatment of barium or strontium sulphate, as the case may be (these sulphates are the most commonly occurring natural barium and strontium ores), with a salt which may be defined as being of the type MX, where M is a basic radical capable of forming a sulphate which is relatively insoluble in a given solvent, and X is an acid radical capable of forming with barium or strontium a salt which is relatively soluble in said given solvent, under such conditions of concentration that a double decomposition reaction takes place with the formation of the sulphate of M and the X salt of barium or strontium, and thereafter extracting the resulting reaction mixture with said selected solvent, and removing the X salt of barium or strontium from the said solvent and purifying it by conventional methods.

In view of the above, it will be seen that the several objects of the invention are achieved and other advantageous results attained.

As many changes could be made in carrying out the above processes without departing from the scope of the invention, it is intended that all matter contained in the above description shall be interpreted as illustrative and not in a limiting sense.

We claim:

1. The process of manufacturing soluble salts of barium or strontium which comprises treating barium or strontium sulphate with a salt of the type MX, where M represents a basic radical selected from a group composed of calcium, magnesium, and aluminum, and X represents an acid radical capable of forming, with barium or strontium, the desired soluble salt, in such a manner that a double decomposition reaction takes place, forming a mixture of the sulphate of M and the X salt of barium or strontium, and thereafter extracting the reaction mixture with a solvent which does not substantially reverse the reaction and which selectively dissolves the X salt of barium or strontium but leaves the sulphate of M substantially undissolved.

2. The process of manufacturing soluble salts of barium or strontium which comprises treating barium or strontium sulphate with the calcium salt of the desired acid, in such manner that a double decomposition reaction takes place forming a mixture of calcium sulphate and the desired barium or strontium salt, and extracting the reaction mixture with a solvent which does not substantially reverse the reaction and which selectively dissolves the barium or strontium salt, but leaves the calcium sulphate substantially undissolved.

3. The process of manufacturing barium or strontium chloride, which comprises treating barium or strontium sulphate with calcium chloride in such a manner that a double decomposition reaction takes place, forming a mixture of barium or strontium chloride and calcium sulphate, and extracting the resultant mixture with a solvent which does not substantially reverse the reaction and which selectively dissolves the barium or strontium chloride, but leaves the calcium sulphate substantially undissolved.

4. The process of manufacturing barium or strontium chloride, which comprises treating barium or strontium sulphate with calcium chloride in such a manner that a double decomposition reaction takes place, forming a mixture of barium or strontium chloride and calcium sulphate, and extracting the resultant mixture with methanol, thereby selectively dissolving the barium or strontium chloride, but leaving the calcium sulphate substantially undissolved.

5. The process of manufacturing barium or strontium chloride, which comprises treating barium or strontium sulphate with calcium chloride in such a manner that a double decomposition reaction takes place, forming a mixture of barium or strontium chloride and calcium sulphate, and extracting the resultant mixture with a mixture of methanol and ethylene glycol, thereby selectively dissolving the barium or strontium chloride, but leaving the calcium sulphate substantially undissolved.

6. The process of manufacturing soluble salts of barium or strontium which comprises treating solid comminuted barium or strontium sulphate with a highly concentrated solution of the calcium salt of the desired acid, thereby engendering a double decomposition reaction forming a mixture of calcium sulphate and the desired barium or strontium salt, and extracting the reaction mixture with a solvent which does not substantially reverse the reaction and which selectively dissolves the barium or strontium salt, but leaves the calcium sulphate substantially undissolved.

7. The process of manufacturing soluble salts of barium or strontium which comprises fusing together barium or strontium sulphate and the calcium salt of the desired acid, thereby engendering a double decomposition reaction forming a mixture of calcium sulphate and the desired barium or strontium salt, and extracting the reaction mixture with a solvent which does not substantially reverse the reaction and which selectively dissolves the barium or strontium salt, but leaves the calcium sulphate substantially undissolved.

8. The process as set forth in claim 1, in which the solvent is methanol.

9. The process as set forth in claim 1, in which the solvent is a mixture of methanol and ethylene glycol.

10. The process of manufacturing barium or strontium nitrate, which comprises treating barium or strontium sulphate with calcium nitrate in such a manner that a double decomposition reaction takes place, forming a mixture of barium or strontium nitrate and calcium sulphate and extracting the resultant mixture with a solvent which does not substantially reverse the reaction and which dissolves the barium or strontium nitrate, but leaves the calcium sulphate substantially undissolved.

11. The process of manufacturing soluble salts of barium or strontium which comprises treating solid comminuted barium or strontium sulphate with the magnesium salt of the desired acid, in such manner that a double decomposition reaction takes place forming a mixture of magnesium sulphate and the desired barium or strontium salt, and extracting the reaction mixture with a solvent which does not substantially reverse the reaction and which selectively dissolves the barium or strontium salt, but leaves the magnesium sulphate substantially undissolved.

12. The process as set forth in claim 1, in which the solvent is methanol which has been diluted to a limited extent with water.

13. The process of manufacturing barium or strontium chloride, which comprises treating barium or strontium sulphate with calcium chloride in such manner that a double decomposition now takes place, forming a mixture of barium or strontium chloride and calcium sulphate, and extracting the resultant mixture with methanol which has been diluted to a limited extent with water, thereby selectively dissolving the barium or strontium chloride, but leaving the calcium sulphate substantially undissolved.

RANDOLPH NORRIS SHREVE.
WILLIAM N. PRITCHARD, Jr.
HENRY V. FARR.
A. JOHN STILL.
JOHN D. CROSBY.